J. C. LUDEN.
VACUUM CLEANER.
APPLICATION FILED OCT. 18, 1909.
950,072.
Patented Feb. 22, 1910.
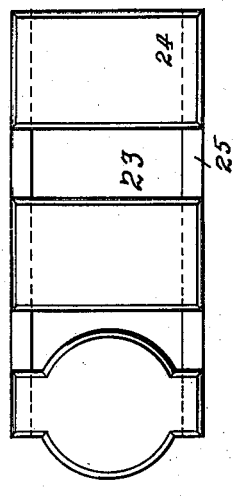
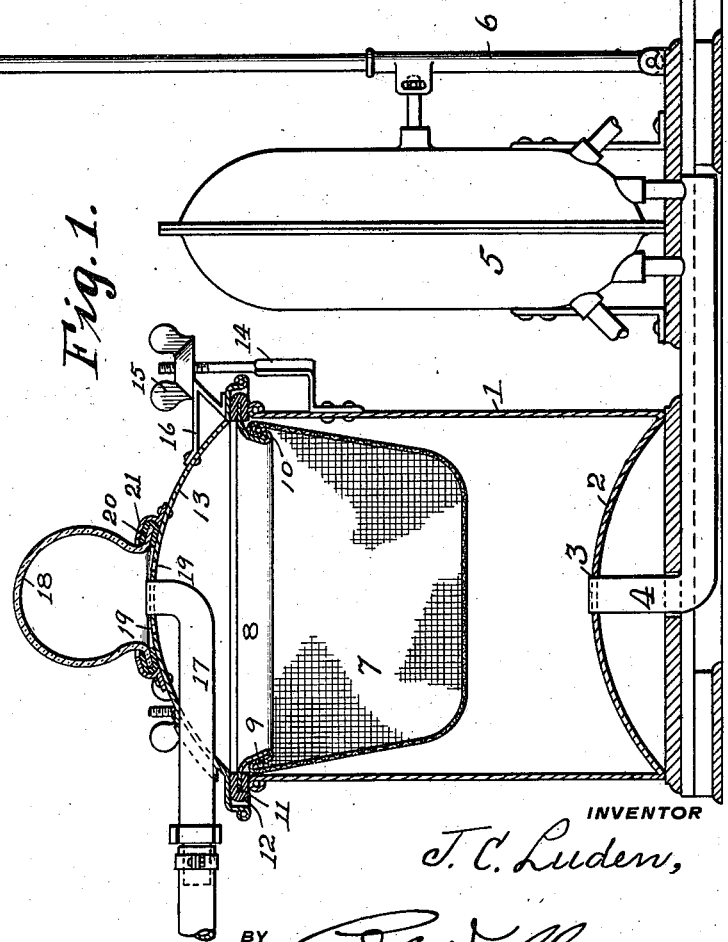
WITNESSES
Daniel Webster, Jr.
J. O'R. Kelly.
INVENTOR
J. C. Luden,
BY
ATTORNEY

UNITED STATES PATENT OFFICE.

JACOB C. LUDEN, OF READING, PENNSYLVANIA.

VACUUM-CLEANER.

950,072.     Specification of Letters Patent.    Patented Feb. 22, 1910.

Application filed October 18, 1909. Serial No. 523,287.

*To all whom it may concern:*

Be it known that I, JACOB C. LUDEN, citizen of the United States, residing at Reading, in the county of Berks and State of Pennsylvania, have invented certain new and useful Improvements in Vacuum-Cleaners, of which the following is a specification.

This invention relates to improvements in vacuum cleaners and as shown in the drawing, it is intended more particularly for use as a hand operated device for domestic use.

One of the objects of my invention is to provide novel means for securing the cover to the dust chamber.

A further object is to provide means for catching the dust particles in a transparent chamber before it enters the separator proper, so that any destructive objects that may be drawn into the dust tube, will not enter and damage the dust strainer.

A further object is to provide means for housing the nozzles and other small parts while not in use.

The invention is more fully described in the following specification and clearly illustrated in the accompanying drawing, in which:—

Figure 1 is a side elevation, partly in section, of my complete device. Fig. 2 is an end view of the platform with the nozzles stored beneath the floor. Fig. 3 is a plan view of the platform. Fig. 4 is a detail view showing the securing means for the dust strainer.

The number 1 designates a cylindrical chamber formed with a concaved bottom 2 having a central opening 3 which is connected by a tube 4 to a vacuum pump 5 of ordinary construction, operated by a hand lever 6, as usual.

On the top edge of the chamber 1 I support the dust receptacle or strainer 7. This strainer is held in position on an annular ring of metal 8 by means of a binding wire 9 which surrounds it and which holds the upper or open end of the strainer securely in the bead 10 formed on the outside of the lower edge of the ring, as shown clearly in Fig. 4. This ring is formed with a flaring upper edge 11 which rests between the layers of a folded rubber washer 12, and on this washer, the cover 13 rests.

The chamber 1 has three or more bolts 14 secured to the outside whose free ends extend upwardly and are screw-threaded to receive wing nuts 15: the cover 13 is formed with an equal number of projections 16, adapted to register with the bolts and to be engaged by the nuts 15 when they are screwed down on the bolts, thus securely clamping the cover onto the chamber 1 with the rubber washer 12 between them.

The cover is formed with a central perforation into which the dust tube 17 leads, being first entered through an opening in the cover at one side. This central opening leads to the inside of an inverted glass chamber 18 secured to the top of the cover. The cover is also formed with a series of smaller perforations 19 surrounding said central opening.

The glass chamber is secured to the cover by means of a folded rubber washer 20 which surrounds the edge of the inverted glass globe and it is held in position by means of a metal ring 21, which engages said washer and is secured to the cover in any suitable manner.

It will be seen that when the pump is operated, the air and dust particles will pass through the dust tube 17 into the initial glass chamber 18 by way of the central bottom opening. Any destructive articles, such as, pins, tacks etc. that would probably injure the dust strainer, are retained in this receptacle and the air and dust passes downward through the smaller perforations surrounding the central inlet opening, and into the dust strainer 7. This glass chamber is of such a size and the particles that enter and are retained therein are so few in number, that even though the chamber is permanently secured to the cover it will operate for approximately the life of the machine before it requires the removal of such objects, but, should such removal become necessary, it would be necessary to either bend the edge of the ring 21 away from its hold on the flange of the chamber or remove the rivets with which it is secured to the cover. This strainer will securely hold all dust particles, letting the air pass through it to the pump, but should any solid objects succeed in getting past the strainer 7, they would be caught in the chamber 1, where they would find their way to the bottom; and as the bottom is concaved, and the air opening at the center or highest point, such objects would naturally fall to the outer rim of the casing.

The entire device rests on a platform 23, which is of skeleton construction, being made up substantially of just sufficient flooring 24 to hold the parts, and two longitudinal strips 25, thus allowing a storage space beneath the flooring for the purpose of housing the nozzles, handle and other parts, for shipping or storing.

Having thus fully described my invention what I claim and desire to secure by Letters Patent is:—

1. In a vacuum cleaner a casing; a cover therefor; an annular ring supported between the cover and the top edge of the casing; a dust strainer; means for securing said strainer in said ring; a glass chamber located on the top of said cover; a dust tube leading into said chamber through the cover; said cover having a series of perforations leading from the glass chamber into the casing and said casing having a concaved bottom with a central air outlet.

2. In a vacuum cleaner a cylindrical casing having a concaved bottom with a central air outlet; a suction tube leading from said outlet; a strainer supported in said chamber; an annular ring; a bead formed on the lower edge of said ring; a securing wire surrounding said ring to hold the strainer in said bead; a folded washer engaging the upper edge of said ring and resting on the top edge of the casing; cover securing bolts on said casing; a cover; projections formed thereon to register with said bolts; an inverted glass chamber secured to the top of said cover; a dust tube passing through said cover and into the glass chamber, said cover having a series of perforations surrounding the entrance of said tube.

In testimony whereof I affix my signature, in presence of two witnesses.

JACOB C. LUDEN.

Witnesses:
 ED. A. KELLY,
 M. H. KREIDER.